United States Patent
Xia

(10) Patent No.: US 9,135,409 B2
(45) Date of Patent: Sep. 15, 2015

(54) DISTRIBUTING UPDATE INFORMATION BASED ON VALIDATED LICENSE INFORMATION

(75) Inventor: Haidong Xia, Roseville, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1008 days.

(21) Appl. No.: 13/110,479

(22) Filed: May 18, 2011

(65) Prior Publication Data

US 2012/0297487 A1 Nov. 22, 2012

(51) Int. Cl.
*G06F 21/10* (2013.01)

(52) U.S. Cl.
CPC .................................. *G06F 21/10* (2013.01)

(58) Field of Classification Search
CPC .. G06F 21/105; G06F 21/10; H04L 2463/103
USPC ......... 705/59, 902; 713/176–180; 726/18–19, 726/24–26
See application file for complete search history.

(56) References Cited

U.S. PATENT DOCUMENTS

| | | |
|---|---|---|
| 5,579,222 A | 11/1996 | Bains et al. |
| 7,080,372 B1 | 7/2006 | Cole |
| 7,865,444 B1 | 1/2011 | Biswas et al. |
| 2004/0260765 A1 | 12/2004 | Re et al. |
| 2005/0086174 A1 | 4/2005 | Eng |
| 2005/0102240 A1 | 5/2005 | Misra et al. |
| 2006/0106727 A1* | 5/2006 | Yellai et al. ................. 705/59 |
| 2008/0285758 A1* | 11/2008 | Chuprov et al. ............ 380/278 |
| 2009/0037492 A1* | 2/2009 | Baitalmal et al. .......... 707/201 |
| 2010/0088519 A1* | 4/2010 | Tsuruoka et al. .......... 713/176 |

* cited by examiner

*Primary Examiner* — Amir Mehrmanesh
(74) *Attorney, Agent, or Firm* — Hewlett-Packard Patent Department

(57) ABSTRACT

Example embodiments disclosed herein relate to distributing updated execution information to a cluster of nodes. Licensing information about whether the nodes are licensed to receive the updated execution information is generated. The licensing information is validated. The validated licensing information is used to distribute the updated execution information to the nodes.

12 Claims, 4 Drawing Sheets

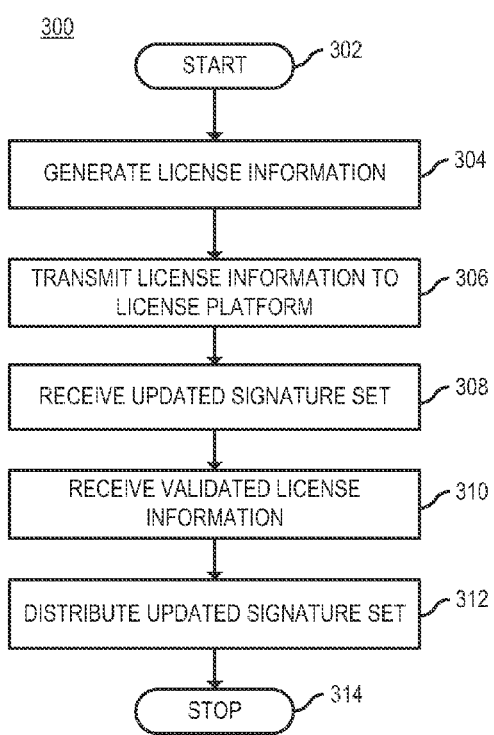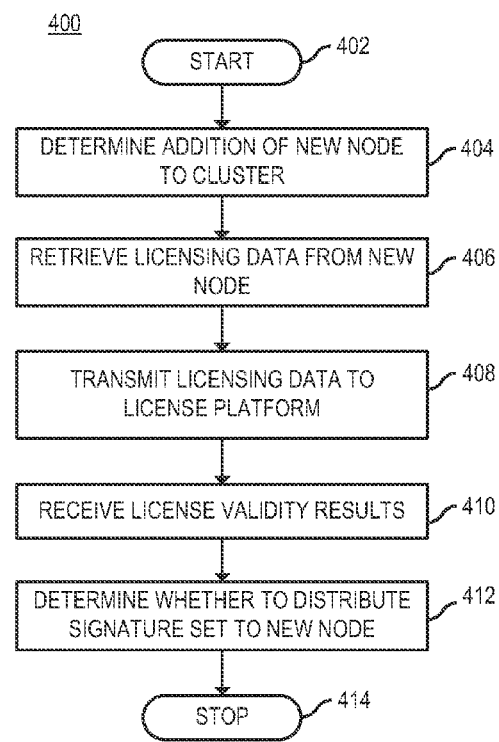
FIG. 3
FIG. 4

DISTRIBUTING UPDATE INFORMATION BASED ON VALIDATED LICENSE INFORMATION

BACKGROUND

Service providers are challenged to deliver quality and value to consumers, for example by providing services, such as data security. Such services may be implemented via computing devices licensed according to an agreement. Further, service providers may update the execution of the computing devices to provide quality services. Various update schemes can be utilized to provide these updates to users.

BRIEF DESCRIPTION OF THE DRAWINGS

The following detailed description references the drawings, wherein:

FIG. 3 is a flowchart of a method for distributing a signature set update based on license validity, according to one example;

FIG. 4 is a flowchart of a method for adding a node to a cluster implementing a license validation scheme, according to one example.

DETAILED DESCRIPTION

Figure 1:
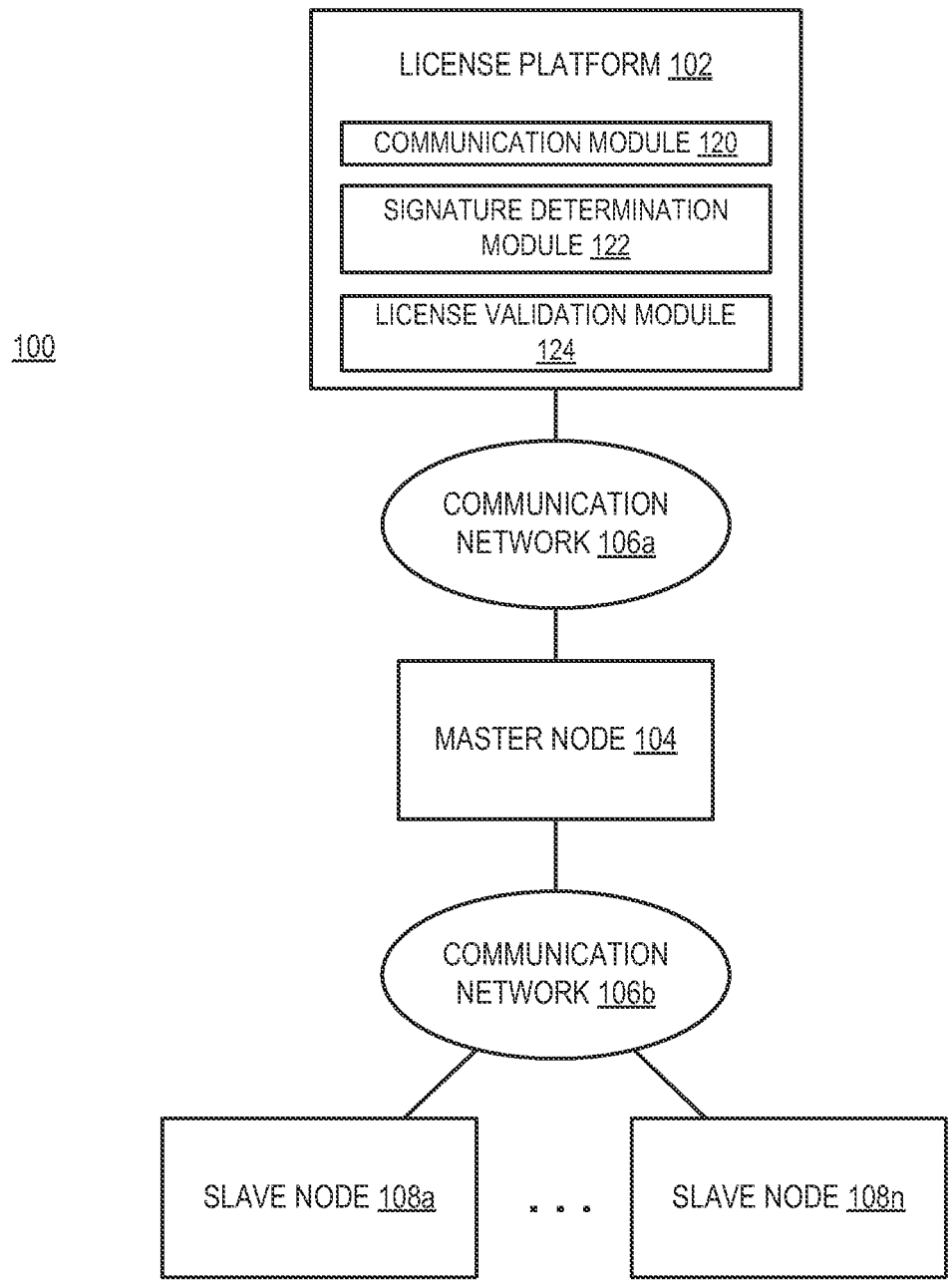
FIG. 1 is a block diagram of a system for license validation, according to one example.

Computing devices and programs providing services to users can be updated. One example of such services is a computer security service, such as an intrusion prevention system (IPS) or a threat management system (TMS). Other examples of services include database systems and network management systems. In the field of computer security, it can be necessary to update features periodically to fight against new malware that is detected. In a signature-based computer security service, this may be accomplished by downloading one or more signatures of malware from a platform with updates. In certain examples, signature based detection is an approach that identifies viruses and other malware by comparing information (e.g., a file, part of a file, information to be executed in memory, etc.) with a signature dictionary. If a known signature is detected, the computer security system can take appropriate steps to contain or eliminate the threat. In certain embodiments, a signature is information that can be used to determine a threat, for example, a malicious piece of code. As such, a signature can be a binary pattern of machine code associated with a particular virus, Trojan horse, or other malware.

Because new malware is created continuously, service providers update signature files to provide to users. When a new threat is detected, it can be reported to the service provider or the service provider can monitor threats. Then, the service provider can generate a signature that can be used to identify the threat and/or take appropriate actions (e.g., deleting the threat). The signature can be stored on a server and distributed to computing systems of the users. Because the services cost money to keep up to date, users may pay for a license (e.g., via a subscription service contract) to receive the updates.

However, because computing systems used by users vary, different licensing and/or updating schemes can be advantageous. One particular example concerns how clusters of computing nodes in high availability mode are licensed. A purpose of a high-availability cluster is to provide for redundancy when a node of the cluster fails. One approach to update signature information for these clusters may be to have a master node of the cluster provide licensing information to receive signature updates to a licensing server and then, once the signature is received, provide the signatures to the other nodes of the cluster, for example, by synchronizing the signatures between the nodes. However, once the signatures are synchronized, if one of the other nodes of the cluster is redeployed to start a new cluster, the new cluster may have access to the updated signatures without the purchase of an additional license.

Accordingly, various embodiments disclosed herein relate to validating individual licenses via a master node and then distributing updated execution information (e.g., updated signatures) based on the validated licenses. This combines a streamlining benefit of having a single node contact a licensing/signature distribution service with a benefit of ensuring that each of the computing nodes of a cluster are licensed before providing updated signatures to the nodes. As such, the licensing/update scheme improves security to make it less likely that a user is able to circumvent licensing procedures.

Referring now to the drawings, FIG. 1 is a block diagram of a system for license validation, according to one example. The system 100 can include a license platform 102 that communicates with a master node 104 of a cluster via a communication network 106a. Further, the master node 104 can communicate with one or more slave nodes 108a-108n via another communication network 106b. In certain scenarios, the communications networks 106a, 106b can be connected.

In certain examples, the license platform 102 and/or the nodes 104, 108a-108n are computing devices, such as servers, workstations, desktop computers, etc. The license platform 102 and the nodes 104, 108a-108n can be implemented via a processing element, memory, and/or other components. One or more of the nodes 104, 108 can be executing a program, for example, a security program. The master node 104 can determine to update a part of its execution information. In certain examples, the updated execution information includes a set of signatures. The master node 104 then generates license information based on information associated with the nodes 104, 108a-108n of the cluster. Licensing information can be requested from each of the slave nodes 108a-108n and received at the master node 104. Further, the master node 104 can have access to its own licensing information. In certain scenarios, the licensing information can include a key or a serial for each of the nodes 104, 108a-108n. Further, the licensing information can include information identifying the nodes (e.g., a hardware identifier such as a processor serial number, an operating system identifier, etc.).

The licensing information is then sent to the license platform 102 for validation. Further, a request can be sent to the license platform 102 for the updated signature set. The key, serial, node identifier, or a combination thereof can correspond to information stored at the license platform 102. As such, the license platform 102 is able to validate the authenticity of licenses associated with the individual nodes. The key and node identification procedure is one example of various licensing schemes and authentication approaches that can be used to determine whether individual nodes 104, 108a-108n have valid licenses to access the updated information.

The license platform 102 can include a communication module 120, a signature determination module 122, and a license validation module 124. The license platform 102 can be a single device (e.g., a server) or multiple devices (e.g., a group of servers, workstations, etc.). The modules 120, 122, 124 may be implemented in the form of executable instructions stored on a machine-readable storage medium, and/or in the form of electronic circuitry. Further, additional components can be used to implement functionality of the license platform 102. For example, the communication module 120 can include or be associated with a transmitter, a receiver, a transceiver, or the like.

The communication module 120 receives the request for the updated signature set from the master node 104. Further, the communication module 120 receives the licensing information describing the nodes 104, 108a-108n. The updated signature set can be determined by the signature determination module 122. The signature determination module 122 may determine the signature set by retrieving the signature set from another device, for example, a signature development platform or a workstation of a software engineer generating signatures. Further, the signature set can be generated at the license platform 102, for example, if the license platform 102 is also used to determine signatures.

In response to receiving the licensing information, the license validation module 124 identifies a set of the nodes 104, 108a-108n to distribute the requested updated signature set to. As such, the license validation module 124 determines which of the nodes have valid licenses. This can be accomplished via various authentication systems, for example, via an authentication system in which the license platform 102 has access to a database that includes valid license information. This database can include, for example, a licenses and identifiers of computing systems (e.g., nodes) that are associated with the respective licenses. Additionally, the licenses can include expiration dates and other validation information. For example, the license validation module 124 may not consider a license that has expired valid.

The communication module 120 then causes transmission of the updated signature set and validated licensing information to the master node 104. As noted above, the validated licensing information can include a set of nodes that have valid licenses. Further, the licensing information can include tokens that can be distributed to the nodes that allow the particular node to use the signature set.

The master node 104 receives the updated signature set and the validated licensing information. Then, the master node 104 distributes the updated signature set to the nodes based on the validated licensing information. The distribution can be performed by reading the validated licensing information for the nodes that should receive the updated signature sets and then sending the updated signature sets to those nodes. When distributing the updated signature set, the master node 104 can synchronize the updated signature set it has with signature sets on the selected licensed nodes.

The communication networks 106 can use wired communications, wireless communications, or combinations thereof. Further, the communication networks 106 can include multiple sub communication networks such as data networks, wireless networks, telephony networks, etc. Such networks can include, for example, a public data network such as the Internet, local area networks (LANs), wide area networks (WANs), metropolitan area networks (MANs), cable networks, fiber optic networks, combinations thereof, or the like. In certain examples, wireless networks may include cellular networks, satellite communications, wireless LANs, etc. Further, the communication networks 106 can be in the form of a direct network link between devices. Various communications structures and infrastructure can be utilized to implement the communication network(s). In certain examples, communication network 106b may represent multiple communication networks, for example, a first network for cluster communications and a second network to communicate to outside devices.

By way of example, the license platform 102 and nodes 104, 108a-108n communicate with each other and other components with access to the respective communication networks 106 via a communication protocol or multiple protocols. A protocol can be a set of rules that defines how nodes of the communication network 106 interact with other nodes. Further, communications between network nodes can be implemented by exchanging discrete packets of data or sending messages. Packets can include header information associated with a protocol (e.g., information on the location of the network node(s) to contact) as well as payload information. A program or application executing on the license platform 102 or nodes 104, 108a-108n can utilize one or more layers of communication to utilize the messages.

As with other computing systems, the cluster including master node 104 and slave nodes 108a-108n may add or subtract nodes at various times. As such, when a new node is added to the cluster, the new node can be checked for a license and receive the updated signature set if the new node has the proper license. When the new node is added, the master node 104 can request and receive license data from the new node. The license data can then be transmitted to the license platform 102.

The communication module 120 of the license platform 102 receives the request to determine whether the new node attached to the cluster can receive the updated signature set (e.g., based on the license data of the new node). The license validation module 124 determines whether the new node has a valid license to receive the updated signature set based on one or more authentication methods. In one example, the license information includes an identifier of the new node and the license validation module 124 checks a license database that correlated computing node identifiers to licenses to determine whether the new node has a valid license. The license validation module 124 then generates notification information to notify the master node 104 of whether the new node has a valid license. The communication module 120 then causes transmission of the notification information to the master node 104.

The master node 104 receives the license validity information for the new node. If the new node is determined to have a valid license, the updated signature set is provided to the new node. In certain scenarios, when the license validation is requested for the new node, there is another update available for the signature set. As such, the license platform 102 can notify the master node 104 of the availability and an updated signature set synchronization can occur.

Figure 2:
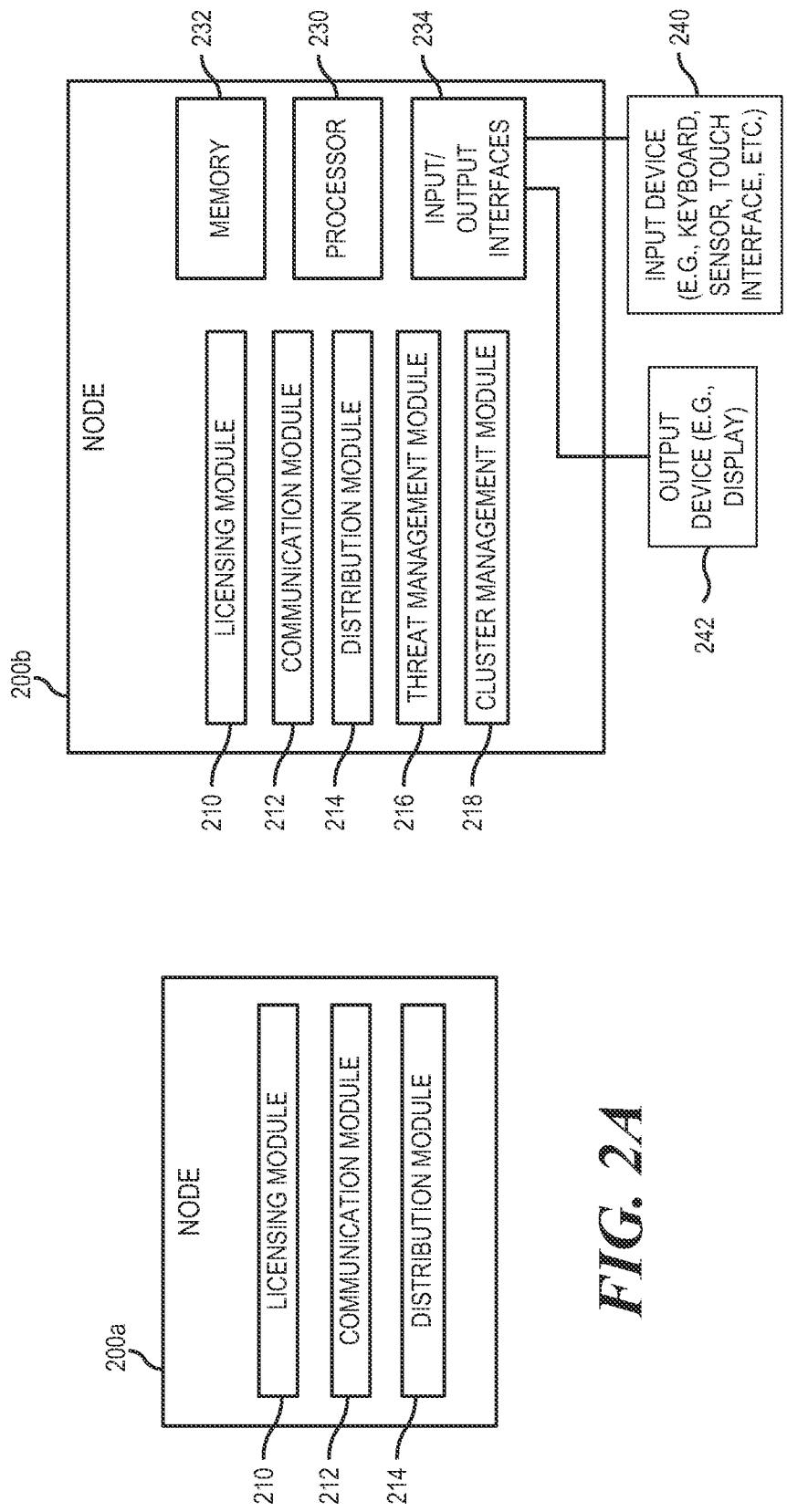
FIGS. 2A and 2B are block diagrams of nodes capable of implementing a license validation scheme, according to various examples.

FIGS. 2A and 2B are block diagrams of nodes capable of implementing a license validation scheme, according to various examples. Nodes 200a, 200b include components that can be utilized to implement the license validation scheme. The respective nodes 200a, 200b may be a notebook computer, a desktop computer, a server, a workstation, or any other computing device. Further, multiple nodes can be combined to form a cluster. One of the nodes can be considered a master node that can handle licensing and/or updating of the nodes of the cluster. In certain scenarios, one or more of the other nodes of the cluster include the capabilities of the master node and may become a master node, for example, if the master node fails. As such, one or more of the nodes of the cluster provide redundancy for the master node.

When acting as a master node, node 200 performs licensing functions for the cluster. As such, the licensing module 210 can be used to generate licensing information about multiple nodes of the cluster. For example, the cluster may include the master node and a slave node or the master node and multiple slave nodes. The licensing information can be generated based on communications with licensing modules of slave nodes. For example, the licensing module 210 causes the communication module 212 to request individual licensing information from slave nodes. The slave nodes can determine its licensing information and return its individual licensing information to the node 200. The node 200 can also determine its individual licensing information. Then, the node 200 can generate the licensing information based on licensing information associated with individual nodes of the cluster. The licensing information can additionally be tied to one or more particular programs, for example, the licensing information can be tied to a threat management service program.

Additionally, the licensing information can be associated with a license to receive updated execution information. In certain embodiments, updated execution information is data that is used to augment the implementation of a program. For example, updated execution information can include signatures that, when code is implemented in a threat management system, augment the implementation of the threat management system program to identify threats associated with the signatures. Further, a trigger to generate the licensing information may be in response to a determination made to update the execution information. The trigger can be set by a user, set based on a calendar, set to be periodic, set based on an interrupt or received information, or the like.

Then, the communication module 212 can transmit the licensing information to a license platform. The communication module 212 can additionally transmit a request to process the licensing information to determine whether one or more of the nodes has a valid license to receive the updated execution information. The license platform may have access to the updated execution information for the associated program. The license platform processes the licensing information to determine if the validity of the licensing information. This can include identifying the nodes of the cluster and determining whether each node has a valid license. The license platform can then generate validated license information based on the processing and send the updated execution information and the validated license information to the node 200.

The node 200 receives the updated execution information and the validated license information from the license platform via the communication module 212. Then, the node 200 uses a distribution module 214 to distribute the updated execution information to the nodes of the cluster based on the validated license information. For example, the distribution module 214 can parse out the validated license information to determine which of the nodes to distribute the updated execution information to. Further, the nodes selected to receive the updated execution information can be nodes whose licensing information have been validated.

Once the updated execution information is sent to the nodes, the nodes can use the updated execution information to modify the execution of one or more modules. In one example, node 200b includes a threat management module 216. The threat management module 216 can identify malicious activity. Further, the threat management module 216 may take actions against said malicious activity, for example, by logging information about the activity, reporting the activity, blocking the activity (e.g., isolating code associated with the activity), deleting the malicious code, or the like. The updated execution information, for example, a set of signatures used to identify the malicious activity may be used by the threat management module 216.

In certain embodiments, the node 200b includes a cluster management module 218. The cluster management module 218 may control activities between nodes of the cluster. For example, the cluster management module 218 can be used to determine activities that are performed on each node. Moreover, the cluster management module 218 can determine where activity associated with one node is accomplished if the node fails. Further, when the node is a master node, the cluster management module 218 can detect when a new node is added to the cluster and provide licensing assistance and updates for the new node. In certain examples, the cluster management module 218 can synchronize information among nodes of the cluster. As such, in certain scenarios, when updated execution information is received, nodes that should receive the updated execution information may be synchronized with the updated execution information. In certain examples, the updated execution information is in the form of one or more files that can be appended to or used with other files (e.g., to create a library or dictionary) already on the nodes. In other examples, the updated execution information can replace older files on the nodes.

A processor 230, such as a central processing unit (CPU) or a microprocessor suitable for retrieval and execution of instructions and/or electronic circuits can be configured to perform the functionality of any of the modules 210-218. In certain scenarios, instructions and/or other information can be included in memory 232 or other memories. Input/output interfaces 234 may additionally be provided by the node 200b. For example, input devices 240, such as a keyboard, a sensor, a touch interface, a mouse, a microphone, etc. can be utilized to receive input from an environment surrounding the node 200b. Further, an output device 242, such as a display, can be utilized to present information to users. Examples of output devices include speakers, display devices, amplifiers, etc. Moreover, in certain embodiments, some components can be utilized to implement functionality of other components.

Each of the modules 210-218 may include, for example, hardware devices including electronic circuitry for implementing the functionality described below. In addition or as an alternative, each module 210-218 may be implemented as a series of instructions encoded on a machine-readable storage medium of node 200 and executable by processor 230. It should be noted that, in some embodiments, some modules are implemented as hardware devices, while other modules are implemented as executable instructions.

FIG. 3 is a flowchart of a method for distributing a signature set update based on license validity, according to one example. Execution of method 300 can be performed at a node 200a, 200b, 500. Additionally, the components for executing the method 300 may be spread among multiple devices. Method 300 may be implemented in the form of executable instructions stored on a machine-readable storage medium and/or in the form of electronic circuitry.

A cluster that can include a master node and one or more slave nodes can be providing a security system such as a threat management system or intrusion prevention system. The nodes can be executing in a high availability mode, where the operations and/or services of one of the nodes of the cluster can be failed over to another node of the cluster. To execute these security mechanisms, the nodes can be part of a service to receive updates of signatures or sets of signatures of malicious activity (e.g., malicious code). Updates can be triggered in a variety of ways, for example, a request from an administrator, a periodic update trigger, etc. When an update is triggered, the master node can perform method 300.

Method 300 may start at 302 and proceed to 304, where the master node of the cluster generates licensing information based on one or more slave nodes of the cluster. The licensing information may also be based on the master node. In one example, the node can request individual license data from each of the slave nodes. The slave nodes provide their individual license data and the master node receives respective individual license data from the respective slave nodes. The individual license data can be used to generate the licensing information. For example, the individual license data may include an identifier of an associated node and/or a license identifier (e.g., a license key, serial number, etc.). As such, the respective slave nodes can be linked to their individual license data in the licensing information. The individual license data can be compiled into the licensing information that represents the cluster.

Then, at 306, the license information is transmitted to a license platform. In certain examples, a request for an updated signature set is transmitted to the license platform as well. In certain embodiments, an updated signature set is signature information describing malicious activity and can include one or more signatures. For example, the updated signature set includes one or more signatures that modify the execution of the cluster and/or the execution of one or more of the nodes of the cluster. As noted previously, the signatures can be used to facilitate identification of the malicious activity.

The license platform determines the updated signature set. Further, the license platform can validate the licensing information as detailed above. The license platform then sends the updated signature set and the validated license information to the master node.

At 308, the master node receives the updated signature set from the license platform. Further, at 310, the master node receives validated license information from the license platform. The validated license information can identify one or more of the nodes of the cluster to receive the updated signature set. This identification can be based on a determination that the licenses for the identified nodes are valid.

Then, at 312, the master node distributes the updated signature set based on the validated license information. For example, the updated signature set can be distributed to the nodes that are identified by the validated license information. As such, nodes that are not identified as having a valid license may not be distributed the updated signature set. Further, in certain scenarios, the validated license information may have a key, that when sent to the nodes allow the nodes to utilize the updated signature set. Then, at 314, the method 300 stops. The nodes continue execution of other processes.

FIG. 4 is a flowchart of a method for adding a node to a cluster implementing a license validation scheme, according to one example. Execution of method 400 can be performed at a node 200a, 200b, 500. Additionally, the components for executing the method 400 may be spread among multiple devices or nodes. Method 400 may be implemented in the form of executable instructions stored on a machine-readable storage medium and/or in the form of electronic circuitry.

A cluster including a master node and slave nodes can execute one or more programs. These programs may utilize one or more signatures, for example, as utilized in method 300. As such, the cluster can receive updated signature sets based on validated licensing information. Administrators can add nodes from another cluster or deploy new nodes into the cluster (e.g., to replace a node that has failed). This can occur, for example, if the cluster is operating in a high availability mode and an administrator wants to add another node for redundancy.

The method 400 starts at 402 and proceeds to 404, where the master node determines that another slave node has been added to the cluster. The master node and/or the other slave node can include a cluster management module for the determination. For example, the other slave node may identify itself to the master node or the master node may ping a network of nodes for additional nodes to add to the cluster. The master node can determine that the other slave node does not have a signature set that is updated to the same level as the master node. As such, the master node can perform licensing services for the other slave node to update its signature set.

At 406, the master node retrieves individual license data from the other slave node. The individual license data may identify the other slave node and/or provide other information that can be used to verify that the other slave node has a license to use the updated signature set that the master node is using. Then, the master node transmits the individual license data to a license platform (at 408). As noted above, the license platform can verify licenses and may have access to updated signature sets. The license platform determines whether the individual license data is valid and sends the results to the master node.

At 410, the master node receives validated license information from the license platform. The validated license information can include whether the updated signature set should be provided to the other slave node. As such, at 412, the master node determines to distribute the updated signature set to the other slave node based on the validated license information. If the other slave node has a valid license, then the updated signature set is provided to the other slave node. If the other slave node does not have a valid license, other methods can be performed. For example, the master node may generate a request to obtain a valid license for the slave node. This may constitute generating an e-mail and sending the e-mail to an administrator. Then, at 414, the method 400 stops.

In certain examples, when the master node requests the license platform to determine the license status of the other slave node, the license platform can determine whether the master node has the latest version of the updated signature set. As such, method 300 can be prompted based on a license request used when a new node is added.

Figure 5:
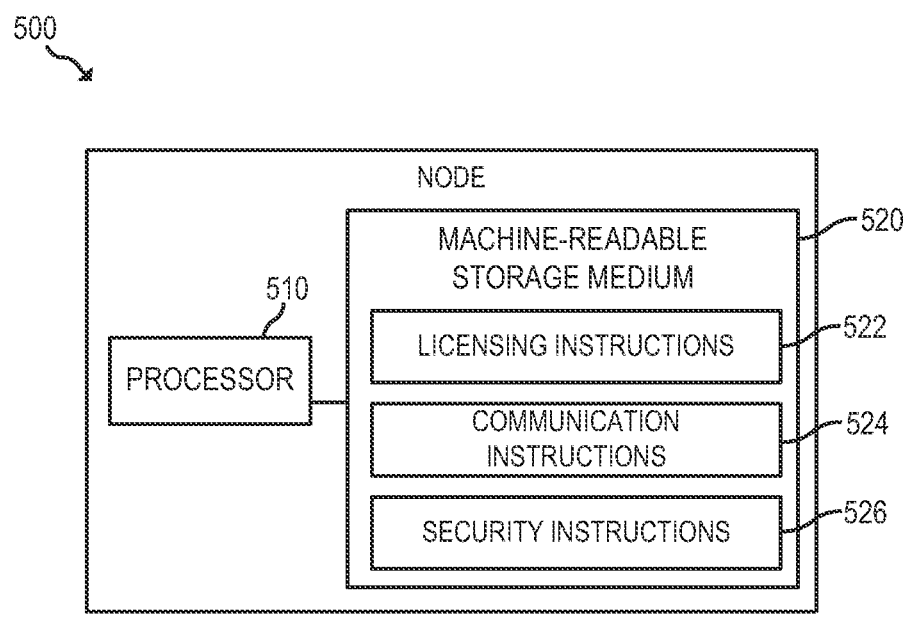
FIG. 5 is a block diagram of a node implementing a license validation scheme, according to one example.

FIG. 5 is a block diagram of a node implementing a license validation scheme, according to one example. The node 500 includes, for example, a processor 510, and a machine-readable storage medium 520 including instructions 522, 524, 526 for implementing a license validation scheme for a cluster the node belongs to. Node 500 may be, for example, a notebook computer, a slate computing device, a server, a workstation, or any other computing device. A cluster can include one or more nodes 500.

Processor 510 may be, at least one central processing unit, at least one semiconductor-based microprocessor, at least one graphics processing unit, other hardware devices suitable for retrieval and execution of instructions stored in machine-readable storage medium 520, or combinations thereof. For example, the processor 510 may include multiple cores on a chip, include multiple cores across multiple chips, multiple cores across multiple devices, or combinations thereof. Processor 510 may fetch, decode, and execute instructions 522, 524, 526 to implement processes, for example, methods 300, 400. As an alternative or in addition to retrieving and executing instructions, processor 510 may include at least one integrated circuit (IC), other control logic, other electronic circuits, or combinations thereof that include a number of electronic components for performing the functionality of instructions 522, 524, 526.

Machine-readable storage medium 520 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail below, machine-readable storage medium 520 may be encoded with a series of executable instructions for validating licenses for a cluster. Further, the executable instructions 522, 524 can be used to distribute update information, such as signature sets used by security modules of nodes of the cluster.

Security instructions 526 can be used by the node 500 to provide security for one or more computing devices. Security can include providing an intrusion prevention system and/or a threat management system for one or more computing devices, networks, the node itself, or the like. As such, individual nodes of the cluster can execute security instructions 526. In certain scenarios, the node 500 can be a master node and can be in charge of updating information (e.g., signatures) used by the security instructions 526 of one or more nodes of a cluster.

If the master node determines to update signatures, licensing instructions 522 can be executed by the processor 510 to retrieve individual license information from other nodes of the cluster. Communication instructions 524 can be used to request and receive the individual license information. Individual licenses can be associated with whether the other nodes are licensed to receive updates. The individual license information can include licenses and/or identification of the respective nodes that can be used by a license platform to determine whether the node has a valid license. The licensing instructions 522 then cause the processor 510 to generate licensing information for the cluster of nodes. The communication instructions 524 are used to cause sending of the licensing information to the license platform.

The license platform determines whether each node has a valid license and sends validated license information to the node 500. Further, the license platform or another platform associated with the license platform sends updated signatures to the node 500. The node 500 receives the updated signatures and the validated license information. The updated signatures are then sent to the other nodes of the cluster based on the validated license information. Further, the node 500 can utilize the updated signatures if the node 500 has a valid license.

What is claimed is:

1. A computer implemented method comprising:
    requesting respective license data from a set of nodes of a cluster, wherein the set of nodes includes a first node and a second node;
    receiving the respective license data from the set of nodes;
    generating license information at the first node based on the respective license data of the set of nodes, wherein the respective license data includes respective identification information of the set of nodes;
    transmitting the license information from the first node to a license platform;
    receiving, at the first node, an updated signature set from the license platform, wherein the updated signature set includes at least one signature that modifies execution of the cluster, and wherein the at least one signature facilitates identification of malicious activity;
    receiving, at the first node, validated license information from the license platform; and
    distributing from the first node the updated signature set based on the validated license information.

2. The method of claim 1, wherein the duster operates in a high availability mode.

3. The method of claim 1, wherein the license information links the set of nodes to the respective license data.

4. The method of claim 1, wherein the validated license information identifies at least one particular node of the set of nodes to receive the updated signature set, and
    wherein the updated signature set is distributed to the at least one particular nodes.

5. The method of claim 1, further comprising:
    determining at the first node that a third node has been added to the cluster;
    retrieving new license data from the third node:
    transmitting the new license data to the license platform;
    receiving new validated license information from the license platform; and distributing the updated signature set to the third node based on the new validated license information.

6. A non-transitory computer-readable storage medium comprising instructions executable by a processor of a computing node, the instructions comprising:
    a licensing module to generate licensing information of a plurality of nodes of a cluster based on respective license data of the plurality of nodes, wherein the respective license data includes respective identification information of the plurality of nodes, and wherein the plurality of nodes includes the computing node and a slave node;
    a communication module to:
    request the respective license data from the plurality of nodes;
    receive the respective license data from the plurality of nodes transmit the license information to a license platform; and
    receive updated execution information and validated license information from the license platform, wherein the updated execution information includes at least one signature that modifies execution of the cluster, and wherein the at least one signature facilitates identification of malicious activity; and
    via a distribution module to distribute the updated execution information to the plurality of nodes based on the validated license information.

7. The non-transitory computer-readable storage medium of claim 6, wherein the instructions further include: a threat management module to use the updated execution information to detect malware.

8. The non-transitory computer-readable storage medium of claim 6, wherein the updated execution information includes at least one signature that modifies execution of at least one of the plurality of nodes to implement a threat management system.

9. The non-transitory computer-readable storage medium of claim 6, the slave node to provide redundancy for the computing node.

10. A system comprising:
    a cluster including a plurality of nodes, wherein the plurality of nodes includes a first node and a second node; and
    a license platform, implemented using a processing element and memory, comprising:
    a communication module to: request respective license data from the plurality of nodes;
    receive the respective license data from the plurality of nodes receive a request for an updated signature set from the first node, wherein the request is generated at the first node; and receive licensing information of the plurality of nodes from the first node, wherein the licensing information is generated at the first node based on respective license data of the plurality of nodes, and wherein the respective license data includes respective identification information of the plurality of nodes;

a signature determination module to determine the updated signature set, wherein the updated signature set includes at least one signature that modifies execution of the cluster, and wherein the at least one signature facilitates identification of malicious activity; and a license validation module to generate validated licensing information identifying a set of the plurality of nodes to distribute the updated signature set to, the communication module to transmit the validated licensing information and the updated signature set to the first node.

11. The system of claim 10, the license validation module to determines which of the plurality of nodes have corresponding valid licenses, wherein the set of the plurality of nodes includes nodes that have the corresponding valid licenses.

12. The system of claim 10, the communication module to receives a request to determine whether a new node attached to the duster can receive the updated signature set, the license validation module to determine whether the new node has a valid license to receive the update, and the communication module to transmits notification information notifying the node of a validity of the license.

* * * * *

UNITED STATES PATENT AND TRADEMARK OFFICE
CERTIFICATE OF CORRECTION

PATENT NO. : 9,135,409 B2  
APPLICATION NO. : 13/110479  
DATED : September 15, 2015  
INVENTOR(S) : Haidong Xia Page 1 of 1

It is certified that error appears in the above-identified patent and that said Letters Patent is hereby corrected as shown below:

In the Claims

In column 10, line 3, in Claim 2, delete "duster" and insert -- cluster --, therefor.

In column 10, line 11, in Claim 4, delete "nodes." and insert -- node. --, therefor.

In column 10, line 13, in Claim 5, delete "determining" and insert -- determining, --, therefor.

In column 10, line 13, in Claim 5, delete "node" and insert -- node, --, therefor.

In column 10, line 15, in Claim 5, delete "node:" and insert -- node; --, therefor.

In column 11, line 19, in Claim 11, delete "determines" and insert -- determine --, therefor.

In column 11, line 24, in Claim 12, delete "receives" and insert -- receive --, therefor.

In column 11, line 25, in Claim 12, delete "duster" and insert -- cluster --, therefor.

In column 11, line 29, in Claim 12, delete "transmits" and insert -- transmit --, therefor.

Signed and Sealed this  
Fifth Day of July, 2016

Michelle K. Lee  
*Director of the United States Patent and Trademark Office*